(12) United States Patent
Hatta (10) Patent No.: US 8,579,558 B2
(45) Date of Patent: Nov. 12, 2013

(54) CUTTING INSERT, CUTTING TOOL USING THE SAME, AND CUTTING METHOD

(75) Inventor: Kaoru Hatta, Higashiomi (JP)

(73) Assignee: Kyocera Corporation, Kyoto (JP)

( * ) Notice: Subject to any disclaimer, the term of this patent is extended or adjusted under 35 U.S.C. 154(b) by 868 days.

(21) Appl. No.: 12/443,448

(22) PCT Filed: Sep. 28, 2007

(86) PCT No.: PCT/JP2007/069109
§ 371 (c)(1),
(2), (4) Date: Nov. 3, 2009

(87) PCT Pub. No.: WO2008/038805
PCT Pub. Date: Apr. 3, 2008

(65) Prior Publication Data
US 2011/0027027 A1    Feb. 3, 2011

(30) Foreign Application Priority Data

Sep. 29, 2006   (JP) ................................. 2006-268838
Sep. 29, 2006   (JP) ................................. 2006-268839

(51) Int. Cl.
*B23C 5/20*    (2006.01)

(52) U.S. Cl.
USPC ................ 409/132; 407/42; 407/61; 407/113

(58) Field of Classification Search
USPC ................ 407/113–116, 42, 48, 61; 409/132
See application file for complete search history.

(56) References Cited

U.S. PATENT DOCUMENTS 4,681,486 A *   7/1987   Hale ........................... 407/114
6,196,770 B1 *  3/2001   Astrom et al. ................. 407/40

(Continued)

FOREIGN PATENT DOCUMENTS

CN   1597206 A    3/2005
JP   59196107 A   11/1984

(Continued)

OTHER PUBLICATIONS

Chinese language office action dated Apr. 13, 2010 and its English language translation for corresponding Chinese application 200780036282.9.

(Continued)

*Primary Examiner* — Eric A Gates
*Assistant Examiner* — Paul M Janeski
(74) *Attorney, Agent, or Firm* — DLA Piper LLP (US)

(57) ABSTRACT

An insert comprises an insert main body having an upper surface and a plurality of side surfaces, a cutting edge located between both ends of a ridge which is between at least one side surface among the side surfaces and the upper surface, a high-positioned portion located at one end of the ridge, and a low-positioned portion located lower in the thickness direction of the insert main body than the high-positioned portion and located at the other end of the ridge. The cutting edge comprises a first flat cutting edge having substantially the same height as the high-positioned portion, and a tilted cutting edge having a height decreasing from the high-positioned portion toward the low-positioned portion. On at least the one side surface, at least one groove extends from the side surface to the upper surface to divide the cutting edge by the groove, and at least the one groove is formed at a region including an intersection of a first extension line formed by imaginarily extending the first flat cutting edge with a second extension line formed by imaginarily extending the tilted cutting edge. This enables reduction in the occurrence of vibration during cutting, and the chipping.

11 Claims, 9 Drawing Sheets

(56) References Cited

U.S. PATENT DOCUMENTS

| | | | |
|---|---|---|---|
| 6,540,447 B2 | 4/2003 | Nagata et al. | |
| 6,851,897 B2 | 2/2005 | Kubo | |
| 7,802,946 B2 * | 9/2010 | Ishida | 407/113 |
| 2001/0051077 A1 | 12/2001 | Nagata et al. | |
| 2004/0081522 A1 | 4/2004 | Kubo | |
| 2008/0260476 A1 | 10/2008 | Ishida | |
| 2010/0316452 A1 | 12/2010 | Ishida | |

FOREIGN PATENT DOCUMENTS

| | | |
|---|---|---|
| JP | 09057519 A | 3/1997 |
| JP | 2002046010 A | 2/2002 |
| JP | 2003019617 A | 1/2003 |
| JP | 2004148424 A | 5/2004 |
| JP | 2006062048 A | 3/2006 |
| JP | 2006088284 A | 4/2006 |
| WO | 2006035910 A1 | 4/2006 |

OTHER PUBLICATIONS

International search report for corresponding PCT application PCT/JP2007/069109.

Japanese language office action dated May 28, 2013 and its English Statement of Relevance of Non-English References Pursuant to 37 CFR 1.98(a)(3)(i).

* cited by examiner

CUTTING INSERT, CUTTING TOOL USING THE SAME, AND CUTTING METHOD

CROSS-REFERENCE TO THE RELATED APPLICATIONS

This application is a national stage of international application No. PCT/JP2007/069109, filed on Sep. 28, 2007, which also claims the benefit of priority under 37 CFR 119 to Japanese Patent Application No. 2006-268838 filed on Sep. 29, 2006 and Japanese Patent Application No. 2006-268839 filed on Sep. 29, 2006, the entire contents of all of which are incorporated herein by reference.

TECHNICAL FIELD

The present invention relates to a cutting insert mounted on a cutting tool used for cutting of materials such as metal materials, a cutting tool using the cutting insert, and a cutting method.

BACKGROUND ART

Examples of the cutting tool generally used for cutting metal materials and the like include those that a cutting insert having a cutting edge is mounted thereon. For example, Patent Document 1 describes a predetermined cutting insert, and a cutting tool with the cutting insert mounted thereon (specifically, an end mill).

Figure 16:
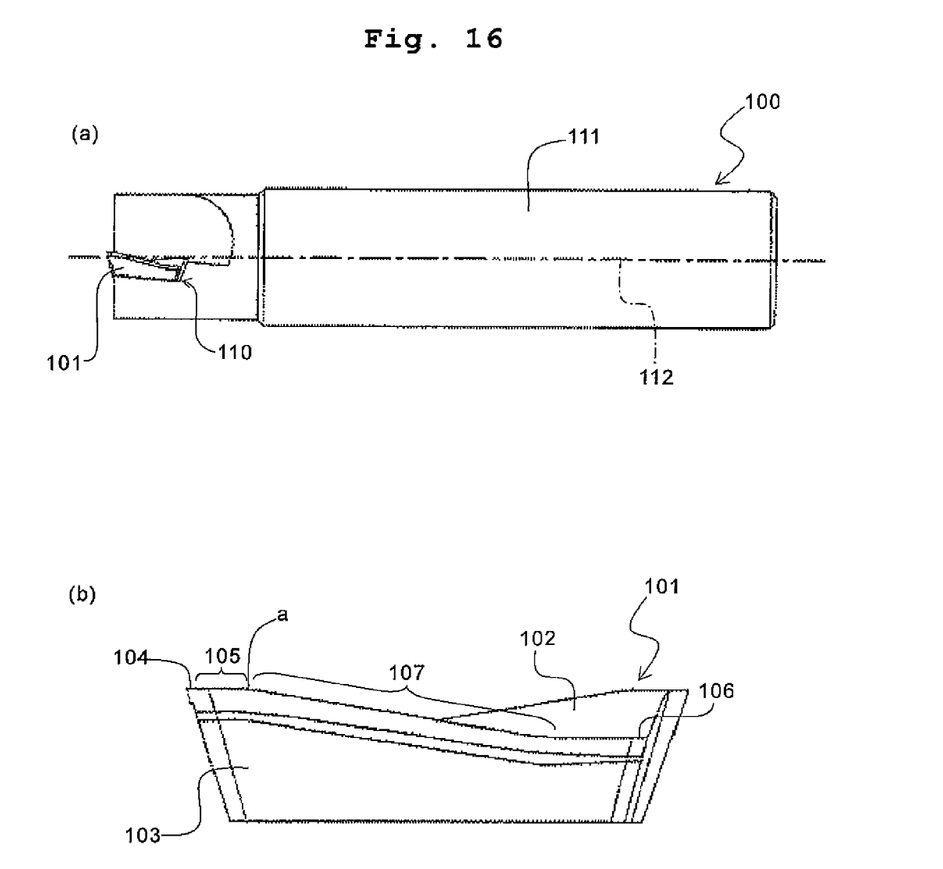
FIG. 16(a) is a side view showing a related art cutting tool.
FIG. 16(b) is an enlarged side view showing a related art cutting insert mounted on the cutting tool in FIG. 16(a).

FIG. 16(a) is a side view showing the related art cutting tool as described in Patent Document 1. FIG. 16(b) is an enlarged side view showing the related art cutting insert mounted on the cutting tool of FIG. 16(a). As shown in FIG. 16(a), a cutting tool 100 as being the end mill is constructed of a cutting insert 101 comprising a cutting edge, and a holder 111 comprising at the tip end thereof a cutting insert pocket 110 for mounting the cutting insert 101. The cutting using the cutting insert 101 is carried out by rotating the holder 111 around an axis 112 of the holder 111.

As shown in FIG. 16(b), the cutting insert 101 has a cutting edge at the ridge between an upper surface 102 and a side surface 103. The cutting edge comprises a high-positioned corner cutting edge 104, a flat cutting edge 105 having substantially the same height as the high-positioned corner cutting edge 104, and a tilted cutting edge 107 having a height gradually decreasing from the high-positioned corner cutting edge 104 toward the low-positioned corner portion 106.

However, the cutting insert 101 thus constructed is subjected to a large cutting force during cutting. Hence, there is the problem that vibration is likely to occur during the cutting, and the cutting edge is susceptible to chipping. This may become a particularly serious problem in heavy cutting.
Patent Document 1: Japanese Unexamined Patent Publication No. 2004-148424

DISCLOSURE OF THE INVENTION

Problems to be Solved by the Invention

An advantage of the invention is to provide a cutting insert and a cutting tool using the cutting insert as well as a cutting method, which are capable of reducing the occurrences of vibration during cutting, and chipping.

Other advantage of the invention is to provide a cutting insert and a cutting tool using the cutting insert as well as a cutting method, which have a small cutting force and excellent cutting performance.

Means for Solving the Problems

In order to solve the above problem, the present inventor carried out intensive consideration to find the following finding. That is, among the above-mentioned cutting edges of the cutting insert 101, the flat cutting edge 105 located near to the tip end of the holder 111 is for retaining the strength of the high-positioned corner cutting edge 104 that is used for cutting all the times. The flat cutting edge 105 requires sufficient strength because the flat cutting edge 105 comes in first contact with a work material in the cutting edge during cutting. Therefore, the flat cutting edge 105 has a substantially the same height as the high-positioned corner cutting edge 104 for achieving compatibility between retention of the sufficient strength and retention of the cutting edge angle.

On the other hand, the arrangement of the tilted cutting edge 107 enables the cutting insert 101 itself to have an axial rake angle. Therefore, cutting properties can be improved and cutting force can be reduced without ensuring a large axial rake angle added to the holder 111 itself when the cutting insert 101 is mounted on the holder 111. This ensures the thickness of the holder 111 located below the bottom surface of the cutting insert 101, thus retaining the rigidity of the holder 111.

However, when the cutting edge is thus constructed, the cutting edge angle is changed in the middle of the cutting edge, namely, the cutting edge has an intersection "a" where the cutting edge angle is changed, at the intersection of the flat cutting edge 105 with the tilted cutting edge 107 (refer to FIG. 16(b)). The intersection "a" is susceptible to stress during cutting. With the intersection "a" as a starting point, vibration is likely to occur during cutting, and a chipping is likely to occur.

In this case, cutting force can be reduced by forming a specific groove at a flank 103. Alternatively, the stress concentrated at the intersection "a" during cutting can be reduced by forming at least one groove at a region including the intersection of an extension line formed by imaginarily extending the flat cutting edge 105 with an extension line formed by imaginarily extending the tilted cutting edge 107, namely the region including the intersection "a" which the cutting edge angle is changed, or by forming a first flat cutting edge so as to adjoin a tilted cutting edge through the groove. As a result, the occurrence of vibration during cutting, and the chipping can be reduced.

Specifically, the cutting insert according to the embodiment of the invention comprises an insert main body having an upper surface and a plurality of side surfaces, a cutting edge located between both ends of a ridge which is between at least one side surface among the side surfaces and the upper surface, a high-positioned portion located at one end of the ridge, and a low-positioned portion located lower in a thickness direction of the insert main body than the high-positioned portion and located at the other end of the ridge. The cutting edge comprises a first flat cutting edge having substantially the same height as the high-positioned portion, and a tilted cutting edge having a height decreasing from the high-positioned portion toward the low-positioned portion, at least one groove extends from at least one side surface to the upper surface to divide the cutting edge by the groove, and at least the one groove is formed in a region including an intersection of a first extension line formed by imaginarily extending the first flat cutting edge with a second extension line formed by imaginarily extending the tilted cutting edge.

Alternatively, the cutting insert according to the embodiment of the invention comprises an insert main body having an upper surface and a plurality of side surfaces, a cutting edge located between both ends of a ridge which is between at least one side surface among the side surfaces and the upper surface, a high-positioned portion located at one end of the ridge, and a low-positioned portion located lower in a thickness direction of the insert main body than the high-positioned portion and located at the other end of the ridge. The cutting edge comprises a first flat cutting edge having substantially the same height as the high-positioned portion, and a tilted cutting edge having a height decreasing from the high-positioned portion toward the low-positioned portion, at least one groove extends from at least one side surface to the upper surface to divide the cutting edge by the groove and the first flat cutting edge and the tilted cutting edge adjoin through the one groove.

In order to solve the above problem, the present inventor further carried out intensive research to find the solution composed of the following configuration, thereby completing the present invention.

Specifically, other cutting insert according to the embodiment of the invention comprises an insert main body having an upper surface and a plurality of side surfaces, a cutting edge located between both ends of a ridge which is between at least one side surface among the side surfaces and the upper surface, a high-positioned portion located at one end of the ridge, and a low-positioned portion located lower in a thickness direction of the insert main body than the high-positioned portion and located at the other end of the ridge. The cutting edge comprises a first flat cutting edge having substantially the same height as the high-positioned portion, and a tilted cutting edge having a height decreasing from the high-positioned portion toward the low-positioned portion, at least one groove extends from the side surface to the upper surface to divide the cutting edge by the groove, and at least the one groove is formed only at the tilted cutting edge.

Other cutting insert according to the embodiment of the invention comprises an insert main body having an upper surface and a plurality of side surfaces, a cutting edge located between both ends of a ridge which is between at least one side surface among the side surfaces and the upper surface, a high-positioned portion located at one end of the ridge, and a low-positioned portion located lower in a thickness direction of the insert main body than the high-positioned portion and located at the other end of the ridge. The cutting edge comprises a first flat cutting edge having substantially the same height as the high-positioned portion, a second flat cutting edge having substantially the same height as the low-positioned portion, and a tilted cutting edge having a height decreasing from the high-positioned portion toward the low-positioned portion, and located between the first flat cutting edge and the second flat cutting edge, at least one groove extends from the side surface to the upper surface to divide the cutting edge by the groove, and the groove is formed only at the tilted cutting edge or the second flat cutting edge.

Still other cutting insert according to the embodiment of the invention comprises an insert main body having an upper surface and a plurality of side surfaces, a cutting edge located between both ends of a ridge which is between at least one side surface among the side surfaces and the upper surface, a high-positioned portion located at one end of the ridge, and a low-positioned portion located lower in a thickness direction of the insert main body than the high-positioned portion and located at the other end of the ridge. The cutting edge comprises a first flat cutting edge having substantially the same height as the high-positioned portion, a second flat cutting edge having substantially the same height as the low-positioned portion, and a tilted cutting edge having a height decreasing from the high-positioned portion toward the low-positioned portion, and located between the first flat cutting edge and the second flat cutting edge. A plurality of grooves extends from the side surface to the upper surface to divide the cutting edge by the groove. When among the plurality of grooves, one nearest to the high-positioned portion is represented by a tip end groove and one groove nearest to the low-positioned portion is represented by a rear end groove, a distance A from the high-positioned portion to the tip end groove is longer than a distance B from the low-positioned portion to the rear end groove.

Effect of the Invention

According to the cutting insert according to the embodiment of the invention, at least one groove extends from the side surface to the upper surface to divide the cutting edge by the groove. Therefore, when cutting is carried out by using the cutting insert with the groove, the work material located at the position corresponding to the groove is not cut, and hence cutting force can be reduced by the amount of the uncut portion.

Additionally, at least the one groove is formed in a region including the intersection of the first extension line formed by imaginarily extending the first flat cutting edge with the second extension line formed by imaginarily extending the tilted cutting edge (that is, the intersection which the cutting edge angle is changed). This enables reduction in the stress concentrated at the intersection during cutting, thereby reducing the occurrence of vibration during cutting, and the chipping.

Since the flat cutting edge and the tilted cutting edge adjoin through the groove, similarly to the above, it is capable of reducing the occurrence of vibration during cutting, and the chipping.

According to other cutting insert according to the embodiment of the invention, at least one groove extends from the side surface to the upper surface to divide the cutting edge by the groove. Similarly to the above cutting insert, the work material located at a position corresponding to the groove is not cut, and hence cutting force can be reduced by the amount of the uncut portion.

Additionally, the groove is formed only at the tilted cutting edge, so that cutting force can be reduced while retaining the strength of the cutting edge. That is, among the cutting edges of the cutting insert, the first flat cutting edge is for retaining the strength of the high-positioned portion used for cutting all the times and needs sufficient strength because the first flat cutting edge comes in first contact with a work material in the cutting edge during cutting.

On the other hand, the arrangement of the tilted cutting edge enables the cutting insert itself to have an axial rake angle, thereby improving cutting properties without ensuring a large axial rake angle added to the tool holder itself by reducing the thickness of the tool holder when the cutting insert is mounted on the tool holder. According to other cutting insert, the groove is formed only at the tilted cutting edge. This eliminates the strength deterioration of the first flat cutting edge due to the formation of the groove dividing the first flat cutting edge, so that the strength of a high-positioned portion used for cutting all the times can be retained. Hence, it is capable of reducing cutting force while retaining the strength of the cutting edge, thereby having excellent cutting performance.

The groove is formed only at the tilted cutting edge or the second flat cutting edge. This eliminates the strength deterioration of the first flat cutting edge due to the formation of the groove dividing the first flat cutting edge, so that cutting force can be reduced while retaining the strength of the cutting edge, thereby having excellent cutting performance. Additionally, the cutting edge comprises the second flat cutting edge, enabling the cutting performance to be further improved.

When among the plurality of grooves, one located nearest to the high-positioned portion is represented by a tip end groove and one located nearest to the low-positioned portion is represented by a rear end groove, a distance A from the high-positioned portion to the tip end groove is longer than a distance B from the low-positioned portion to the rear end groove, thereby ensuring a sufficient strength of the high-positioned portion. As a result, cutting force can be reduced while retaining the strength of the cutting edge, thereby having excellent cutting performance. Additionally, the cutting edge comprises the second flat cutting edge, enabling the cutting performance to be further improved.

PREFERRED EMBODIMENTS FOR CARRYING OUT THE INVENTION

<Cutting Insert>

First Preferred Embodiment

A first preferred embodiment of the cutting insert according to the invention is described in detail with reference to the accompanying drawings.

Figure 1:
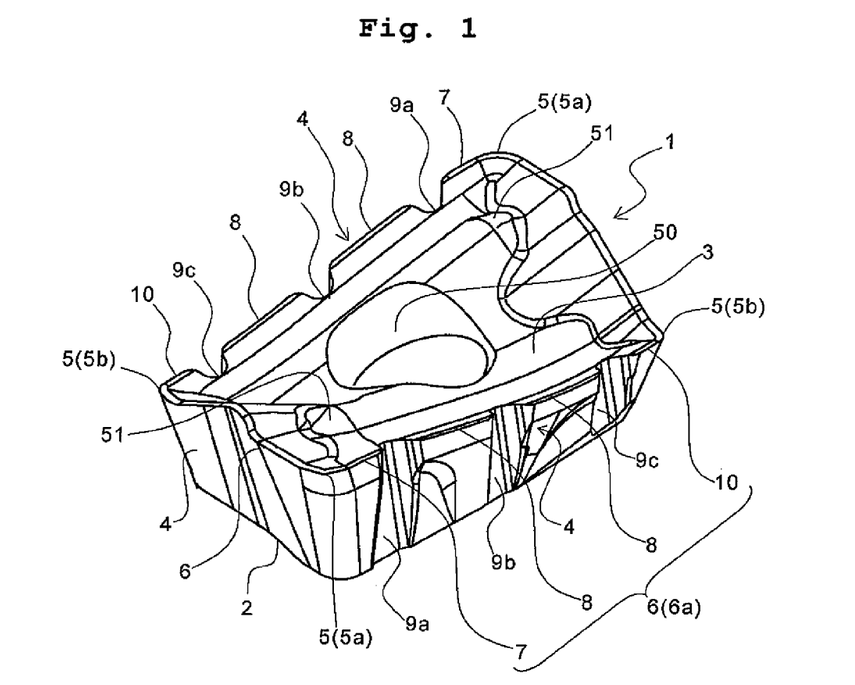
FIG. 1 is a perspective view showing a cutting insert according to a first preferred embodiment of the invention.
Figure 2:
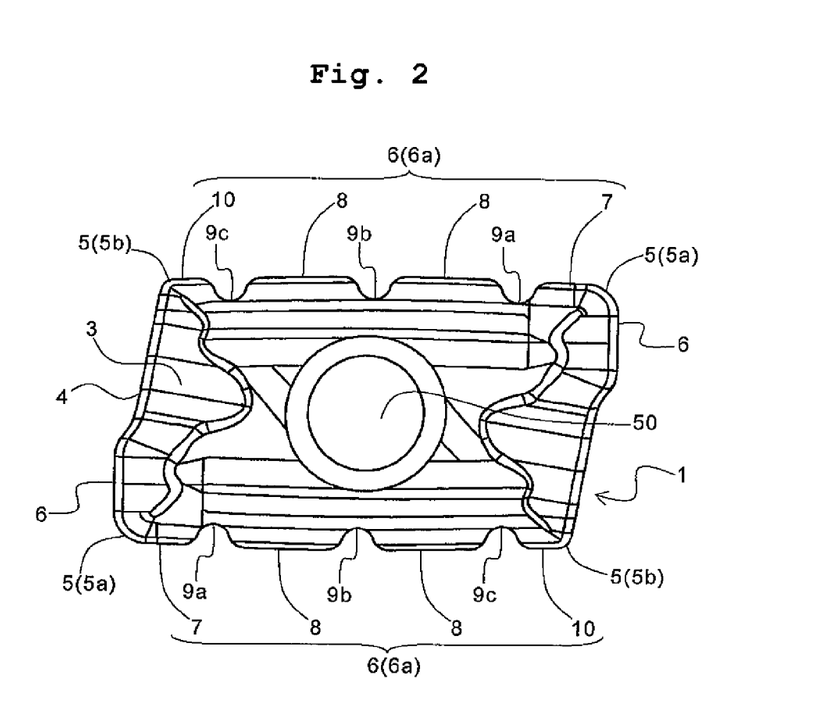
FIG. 2 is a plan view showing the cutting insert according to the first preferred embodiment of the invention.
Figure 3:
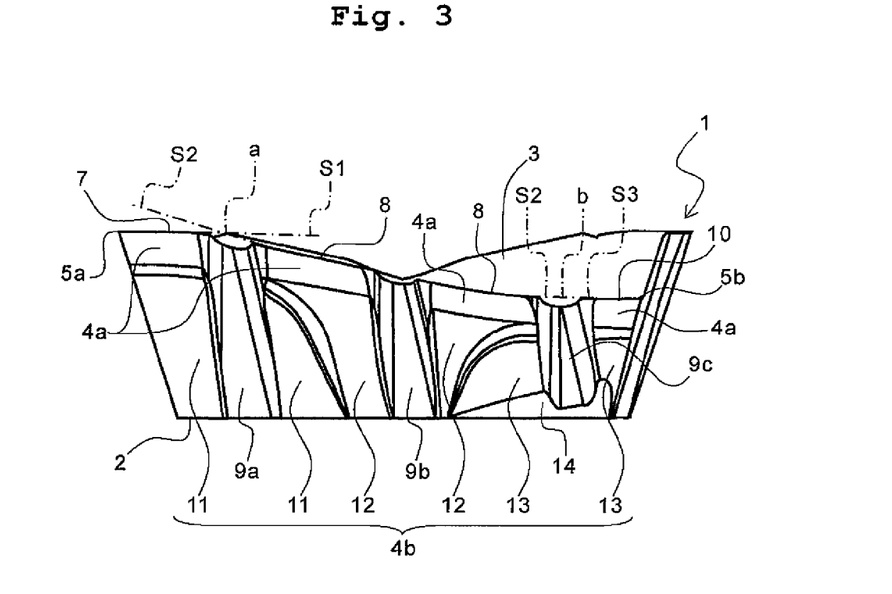
FIG. 3 is a side view showing the cutting insert according to the first preferred embodiment of the invention.

As shown in FIGS. 1 to 3, the cutting insert according to the first preferred embodiment (hereinafter referred to simply as an insert) 1 comprises an insert main body having substantially a parallelogram when viewed from above. The insert 1 comprises a bottom surface 2 serving as a seat surface, an upper surface 3 having a rake face, and a side surface 4 having a flank. The insert 1 comprises further corner portions 5 (5a and 5b) located at the corner parts of the insert main body in a ridge between the upper surface 3 and the side surface 4, and a cutting edge 6 located between these two corner portions 5 and 5 in the ridge (namely between both ends of the ridge) and connected to these two corner portions 5 and 5.

The rake face of the upper surface 3 means the face of the upper surface 3, through which generated chips graze. A through-hole 50 extending through the bottom surface 2 is formed centrally of the upper surface 3. The through-hole 50 is for fixing the insert 1 to a tool holder (hereinafter referred to simply as a holder) 60 shown in FIGS. 12 and 13 described later. The insert 1 has a 180-degree rotationally symmetrical shape with respect to the central axis of the through-hole 50. This is convenient because when one of the cutting edges in use is worn, the insert 1 can be rotated 180 degrees to use the other cutting edge not yet used.

A chip breaker (refer to FIG. 1) is formed so as to have a protuberance 51, which is lowered as it extends from a later described high-positioned corner cutting edge 5a and the cutting edge 6 toward the center and thereafter raised. Owing to this, chips can be curled or divided, enabling smooth discharge of the chips to be generated.

The corner portion 5 comprises two high-positioned corner cutting edges 5a and 5a (the high-positioned portions) located on one diagonal, and two low-positioned corner portions 5b and 5b (the low-positioned portions), which are located lower than the high-positioned corner cutting edges 5a in the thickness direction of the insert main body and located on the other diagonal. The high-positioned corner cutting edges 5a are cutting edges used for cutting all the times. Preferably, the radius of curvature thereof is usually about 0.4 to 6.4 mm in terms of the balance between the strength of the cutting edge and machining shape.

In the cutting edge 6, the main cutting edge 6a located in the longitudinal direction of the insert 1 comprises a first flat cutting edge 7 having substantially the same height as the high-positioned corner cutting edge 5a, and a tilted cutting edge 8 having a height decreasing from the high-positioned corner cutting edge 5a toward the low-positioned corner portion 5b. The first flat cutting edge 7 is for retaining the strength of the high-positioned corner cutting edges 5a used for cutting all the times, and needs strength because the first flat cutting edge 7 comes in first contact with a work material in the cutting edge during cutting. Therefore, the first flat cutting edge 7 has substantially the same height with the high-positioned corner cutting edges 5a in order to achieve compatibility between the strength and the cutting edge angle retention.

The arrangement of the tilted cutting edge 8 enables the insert 1 itself to have an axial rake angle. This improves cutting properties and reduces cutting force without ensuring a large axial rake angle added to the holder 60 by reducing the thickness of the holder 60 when the insert 1 is mounted on the holder 60. For the above reason, the axial rake angle added to the holder 60 when the insert 1 is mounted on the holder 60 can be minimized to ensure the thickness of the holder 60 located below the bottom surface 2 of the insert 1, thus retaining the rigidity of the holder 60.

Figure 4:
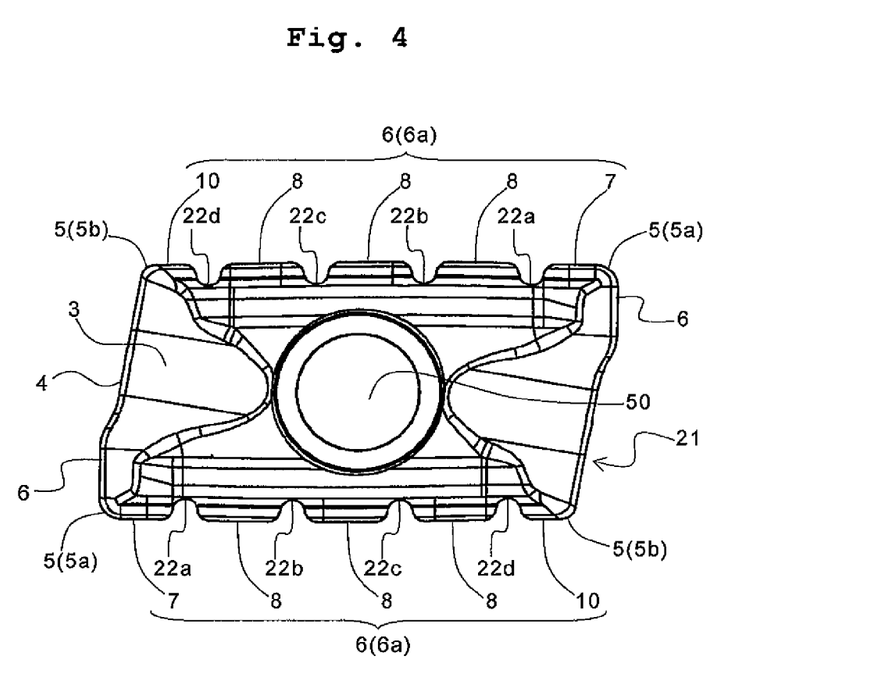
FIG. 4 is a plan view showing the cutting insert according to a second preferred embodiment of the invention.
Figure 5:
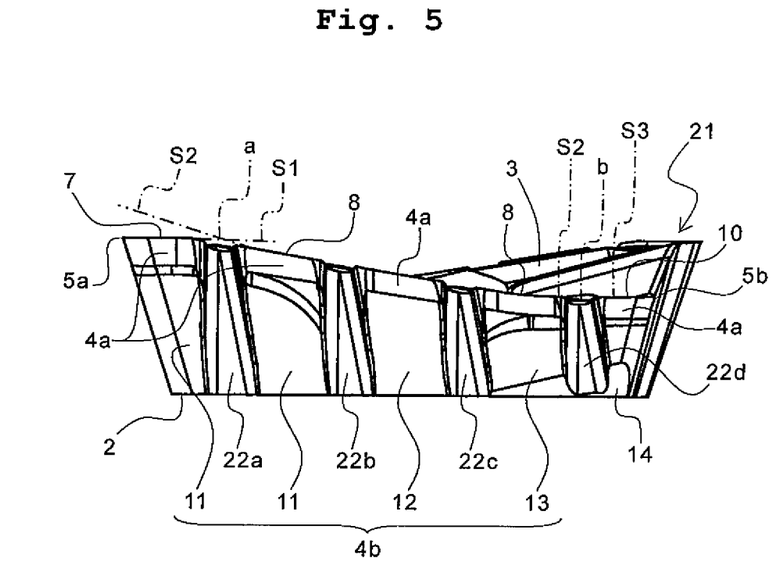
FIG. 5 is a side view showing the cutting insert according to the second preferred embodiment of the invention.

At the side surface 4 in each longitudinal direction of the insert 1, grooves 9a, 9b and 9c as a plurality of grooves (nicks) extend from the side surface 4 to the upper surface 3 to divide the cutting edge 6a by the grooves. These enable reduction in cutting force during cutting. That is, when the insert 1 is used to perform cutting, the work material located at the positions corresponding to these grooves 9a, 9b and 9c are not cut, so that the cutting force can be reduced by the amount of these uncut portions. These uncut portions may be subjected to cutting by, for example, adjusting the mounting position of the insert 1 in the holder 60 to be described later, or the insert 1 in combination with an insert 21 comprising four grooves as shown in FIGS. 4 and 5.

As shown in FIG. 3, the groove 9a among the grooves 9a, 9b and 9c is formed at a region including an intersection "a" of a first extension line S1 formed by imaginarily extending the first flat cutting edge 7 with a second extension line S2 formed by imaginarily extending the tilted cutting edge 8. The first flat cutting edge 7 and the tilted cutting edge 8 adjoin through the groove 9a. This enables reduction in the stress concentrated at the intersection "a" during cutting, thereby reducing the occurrence of vibration during cutting, and the chipping. In contrast, when the groove 9a is not formed at the region including the intersection "a", or when the first flat cutting edge 7 and the tilted cutting edge 8 don't adjoin through the groove 9a, vibration may occur during cutting and the chipping may occur.

Particularly in the first preferred embodiment, among the plurality of grooves 9a, 9b and 9c formed at the main cutting edge 6a, the groove 9a formed at the region including the intersection "a" is located at the high position corner cutting edge 5a. This enables retention of the strength of the first flat cutting edge 7 subjected to a large stress because the first flat cutting edge 7 conies in first contact the work material in the cutting edge during cutting. In contrast, when a groove is further formed more adjacently to the high-positioned corner cutting edge 5a than the groove 9a, the thickness of the first flat cutting edge 7 is reduced to deteriorate the strength thereof, and the chipping might occur.

The grooves 9a, 9b and 9c have the width gradually increasing from the upper surface 3 toward the lower surface 2. This enables reduction in the strength deterioration due to the reduced thickness of the main cutting edge 6a, and retention of the strength of the main cutting edge 6a. By arranging so that at least the groove 9a located nearest to the high-positioned corner portion 5a has the above configuration, it is possible to retain the strength of the high-positioned corner cutting edge 5a used for cutting all the times.

The main cutting edge 6a comprises a second flat cutting edge 10 having substantially the same height as the low-positioned corner portion 5b, thereby improving cutting properties. It is also capable of reducing the strength deterioration of the insert 1 due to the thickness decrease at the rear end portion of the main cutting edge 6a, thereby ensuring the clamping area of the side surface 4 with respect to the holder 60.

Additionally, the tilted cutting edge 8 is located between the first flat cutting edge 7 and the second flat cutting edge 10, and the groove 9c is formed at a region including an intersection "b" of the second extension line S2 formed by imaginarily extending the tilted cutting edge 6a with a third extension line S3 formed by imaginarily extending the second flat cutting edge 10. This enables reduction in the stress concentrated at the intersection "b" during cutting, thereby reducing the occurrence of vibration during cutting, and the chipping, as in the case with the above-mentioned intersection "a".

The side surface 4 in the longitudinal direction of the insert 1 comprises provided with a cutting edge-side flank 4a, whose clearance angle is increased from the high-positioned corner cutting edge 5a toward the low-positioned corner portion 5b, formed at the main cutting edge 6a (refer to FIG. 3). This ensures the strength of the cutting edge because even under the state that an axial rake angle is added, or the insert 1 is mounted on the holder 60 so that the edge of blade corresponds to a center height (the radial rake angle is a negative angle), the insert 1 can be maintained at a proper angle without the possibility that the clearance angle with the insert 1 mounted on the holder 60 (the actual clearance angle) becomes too large.

In the side surface 4 in the longitudinal direction of the insert 1, the side surface 4b extending from the cutting edge flank 4a to the bottom surface 2 has a first flank 11 at a low-positioned region in the thickness direction of the insert main body of the first flat cutting edge 7, a second flank 12 at the low-positioned region of the tilted cutting edge 8, and a third flank 13 at the low-positioned region of the second flat cutting edge 10. The first flank 11 and the third flank 13 comprise clamping surfaces on substantially the same surface as each other respectively. That is, the first flank 11 and the third flank 13 are configured at substantially the same clearance angle. Accordingly, when the insert 1 is mounted on the holder 60, the first flank 11 and the third flank 13 function as a stabilizing surface for contacting with the holder 60, namely the clamping surface, so that the clamping force against the holder 60 can be enhanced to further reduce the occurrence of vibration during cutting. Although in the first preferred embodiment, the second flank 12 is configured so as to project from the first flank 11 and the third flank 13, the present invention is not limited thereto, and the first flank 11, the second flank 12 and the third flank 13 may be configured at substantially the same clearance angle.

The third flank 13 comprises a flat portion 14 having a width gradually increasing from the high-positioned corner cutting edge 5a toward the low-positioned corner portion 5b (refer to FIG. 3). Thus, when the insert 1 is mounted on the holder 60 by having a positive axial rake angle to the insert 1 itself, it is possible to reduce the interference between the corner parts of the bottom surface 2 of the insert 1 and the work material.

Second Preferred Embodiment

A second preferred embodiment next is described with reference to the accompanying drawings. In FIGS. 4 and 5 referred to here, the same references have been used as in FIGS. 1 to 3 for similar parts, and the description thereof is omitted.

The difference between the insert of the second preferred embodiment and the insert 1 of the first preferred embodiment is the number of grooves formed, that is, the former has four grooves and the latter has the three grooves. Specifically, as shown in FIGS. 4 and 5, an insert 21 of the second preferred embodiment comprises, on a side surface 4 in each longitudinal direction, grooves 22a, 22b, 22c and 22d as a plurality of grooves extending from the side surface 4 to an upper surface 3 to divide a main cutting edge 6a. Thus, the insert 21 has a larger number of the grooves than the insert 1, enabling a further reduction of the cutting force during cutting.

The groove 22a among these grooves 22a, 22b, 22c and 22d is formed at a region including an intersection "a" of a first extension line S1 formed by imaginarily extending a first flat cutting edge 7 with a second extension line S2 formed by imaginarily extending a tilted cutting edge 8. The first flat cutting edge 7 and the tilted cutting edge 8 adjoin through the groove 22a. Like the first preferred embodiment, the configuration of the second preferred embodiment comprising these four grooves is also capable of reducing the stress concentrated at the intersection "a" during cutting, thereby reducing the occurrence of vibration during cutting, and the chipping.

Also in the second preferred embodiment, the groove 22d is formed at a region including an intersection "b" of the second extension line S2 formed by imaginarily extending the tilted cutting edge 8 with a third extension line S3 formed by imaginarily extending a second flat cutting edge 10. This enables reduction in the stress concentrated at the intersection "b" during cutting, as in the case of the first preferred embodiment described above.

The grooves 22a to 22d have their respective widths becoming wider from an upper surface 3 toward a lower surface 2. This enables retention of the strength of a main cutting edge 6a.

Otherwise, the configuration is identical to that described in the first preferred embodiment, and the description thereof is omitted.

Third Preferred Embodiment

Figure 6:
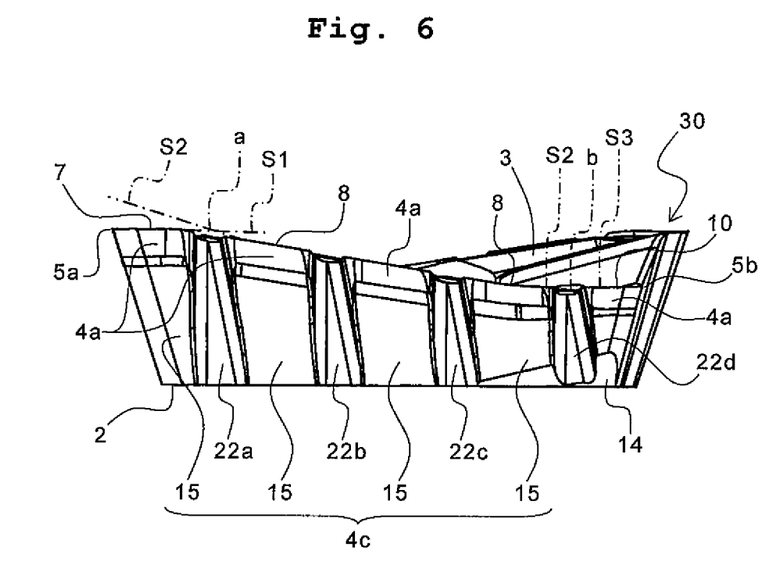
FIG. 6 is a side view showing the cutting insert according to a third preferred embodiment of the invention.

A third preferred embodiment is next described with reference to the accompanying drawing. In FIG. 6 referred to here, the same references have been used as in FIGS. 1 to 5 for similar parts, and the description thereof is omitted.

The difference between the insert of the third preferred embodiment and the insert 21 of the second preferred embodiment is the formation of the first flank 11, the second flank 12 and the third flank 13 on the side surface extending from the cutting edge-side flank 4a to the bottom surface 2. That is, the former has none of these flanks, and the latter has all of them. Specifically, as shown in FIG. 6, in an insert 30 of the third preferred embodiment, a side surface 4c extending from a cutting edge-side flank 4a to a bottom surface 2 comprises a flank 15, whose clearance angle is gradually changed from a high-positioned corner cutting edge 5a toward a low-positioned corner portion 5b. This simplifies the process of machining the side surface 4c, thereby achieving cost reduction.

Among grooves 22a to 22d, the groove 22a is formed at a region including the intersection "a", and a first flat cutting edge 7 and a tilted cutting edge 8 adjoin through the groove 22a. Like the first or second preferred embodiment, the configuration of the third preferred embodiment is also capable of reducing the stress concentrated at the intersection "a" during cutting, thereby reducing the occurrence of vibration during cutting, and the chipping.

Otherwise, the configuration is identical to that described in the first and second preferred embodiments, and the description thereof is omitted.

Fourth Preferred Embodiment

Figure 7:
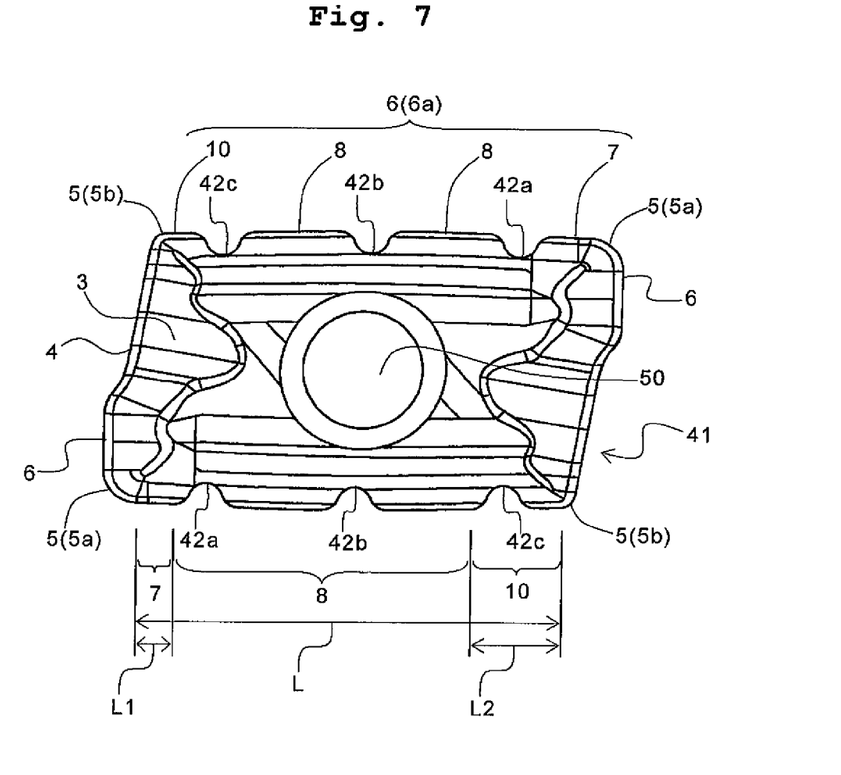
FIG. 7 is a plan view showing the cutting insert according to a fourth preferred embodiment of the invention.
Figure 8:
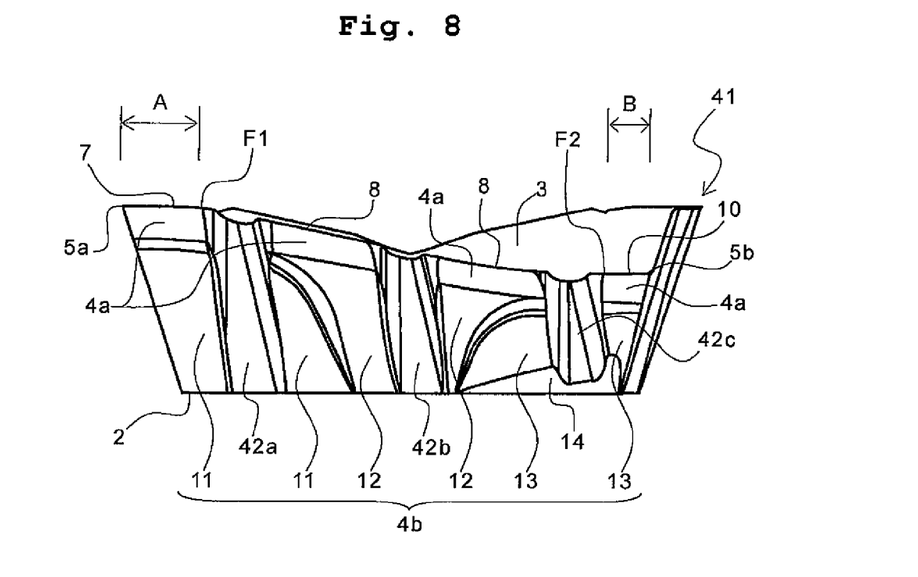
FIG. 8 is a side view showing the cutting insert according to the fourth preferred embodiment of the invention.

A fourth preferred embodiment is next described with reference to the accompanying drawings. In FIGS. 7 and 8 referred to here, the same references have been used as in FIGS. 1 to 6 for similar parts, and the description thereof is omitted.

As shown in FIGS. 7 and 8, an insert 41 according to the fourth preferred embodiment comprises grooves 42a, 42b and 43c on a side surface 4 in the longitudinal direction thereof. Grooves 42a, 42b and 43c as a plurality of grooves extend from the side surface 4 to an upper surface 3 to divide a main cutting edge 6a by the grooves. These enable reduction in cutting force during cutting.

These grooves 42a, 42b and 43c are formed only at a tilted cutting edge 8 and a second flat cutting edge 10 (refer to FIG. 7). This eliminates the strength deterioration of a first flat cutting edge 7 due to the formation of the groove at the first flat cutting edge 7, and the strength of a high-positioned corner cutting edge 5a can be retained, enabling reduction in cutting force while retaining the strength of the cutting edge.

As shown in FIG. 8, when among the grooves 42a, 42b and 42c in the fourth preferred embodiment, the groove 42a located nearest to the high-positioned corner cutting edge 5a is represented by a tip end groove, and the groove 42c located nearest to the low-positioned corner portion 5b is represented by a rear end groove, a distance A from the high-positioned corner cutting edge 5a to the tip end groove (42a) is longer than a distance B from the low-positioned corner portion 5b to the rear end groove (42c). Thus, the strength of the high-positioned corner cutting edge 5a can be sufficiently retained, and cutting force can be reduced while retaining the strength of the cutting edge, thereby having excellent cutting performance.

On the other hand, if the distance A and the distance B do not establish the above predetermined relationship, the strength of the high-positioned corner cutting edge 5a is liable to deteriorate and the chipping is likely to occur.

The distance A means the distance from the high-positioned corner cutting edge 5a to an edge portion F1 located nearest to the high-positioned corner cutting edge 5a in the groove 42a. The distance B means the distance from the low-positioned corner portion 5b to an edge portion F2 located nearest to the low-positioned corner portion 5b in the groove 42c.

As shown in FIG. 7, L:L1=1:0.15 to 0.30, preferably 1:0.15, where L represents the length of the main cutting edge 6a, and L1 represents the length of the first flat cutting edge 7. This imparts sufficient strength to the first flat cutting edge 7, so that the strength of the high-positioned corner cutting edge 5a can be surely retained.

Preferably, the first flat cutting edge 7 is shorter than the second flat cutting edge 10. In this case, the load exerted on the first flat cutting edge 7 during cutting can be reduced to further reduce cutting force. Specifically, as shown in FIG. 7, L1:L2=1:2 to 4, preferably 1:2, where L1 represents the length of the first flat cutting edge 7, and L2 represents the length of the second flat cutting edge 10. This enables a further reduction in cutting force.

The grooves 42a, 42b and 42c have their respective widths gradually increasing from an upper surface 3 to a lower surface 2. This enables retention of the strength of the main cutting edge 6a.

Although in the fourth preferred embodiment, the main cutting edge 6a comprises the second flat cutting edge 10, the second flat cutting edge 10 may be omitted depending on the use. In this case, the grooves 42a, 42b and 42c as a plurality of grooves may be formed only at the tilted cutting edge 8, thereby achieving the same effect as in the case described above.

Otherwise, the configuration is identical to that described in the first to third preferred embodiments, and the description thereof is omitted.

Fifth Preferred Embodiment

Figure 9:
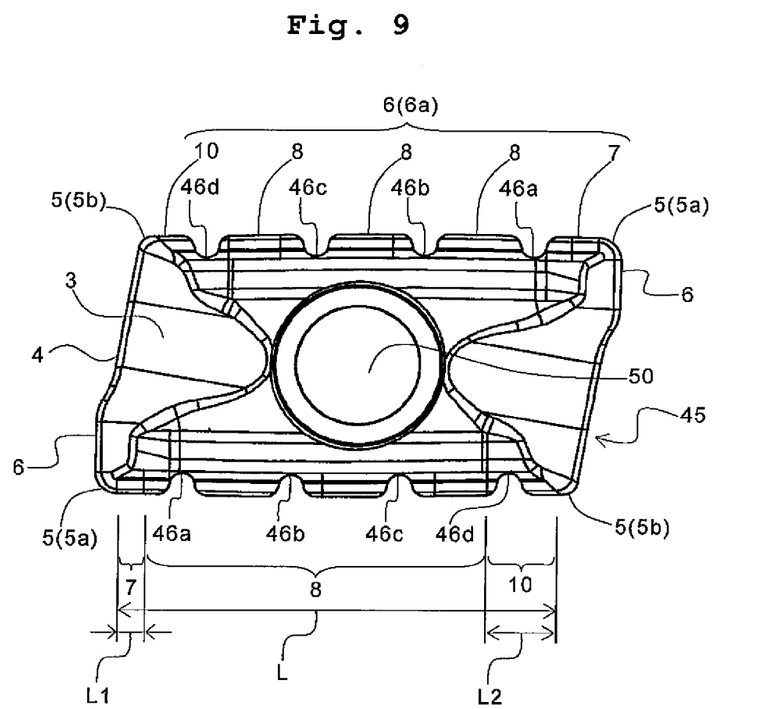
FIG. 9 is a plan view showing the cutting insert according to a fifth preferred embodiment of the invention.
Figure 10:
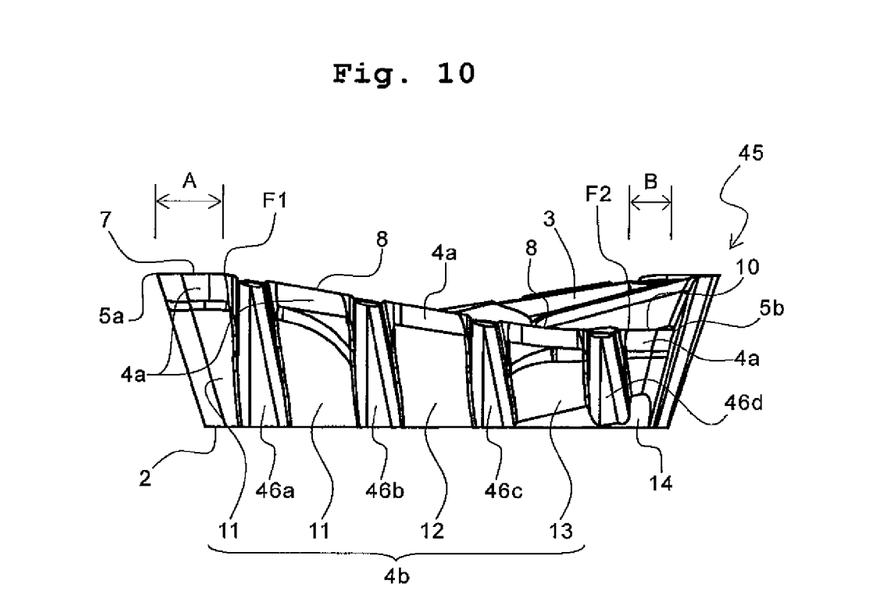
FIG. 10 is a side view showing the cutting insert according to the fifth preferred embodiment of the invention.

A fifth preferred embodiment is next described with reference to the accompanying drawings. In FIGS. 9 and 10 referred to here, the same references have been used as in FIGS. 1 to 8 for similar parts, and the description thereof is omitted.

The difference between the insert of the fifth preferred embodiment and the insert 41 of the fourth preferred embodiment is the number of grooves formed, that is, the former has four grooves and the latter has the three grooves. Specifically, as shown in FIGS. 9 and 10, an insert 45 of the fifth preferred embodiment comprises, on a side surface 4 in each longitudinal direction, grooves 46a, 46b, 46c and 46d as a plurality of grooves extending from the side surface 4 to an upper surface 3 to divide the main cutting edge 6a. Thus, the insert 45 has a larger number of the grooves than the insert 41, enabling a further reduction of the cutting force during cutting.

Like the fourth preferred embodiment described above, these grooves 46a to 46d are formed only at a tilted cutting edge 8 and a second flat cutting edge 10. Consequently, like the fourth preferred embodiment, the fifth preferred embodiment comprising the four grooves also eliminates the strength deterioration of a first flat cutting edge 7 due to the formation of the groove at the first flat cutting edge 7, and the strength of a high-positioned corner cutting edge 5a can be retained, enabling reduction in cutting force while retaining the strength of the cutting edge. Especially, the fifth preferred embodiment has a larger number of grooves than the fourth preferred embodiment, thus enabling a further reduction in the cutting force during cutting.

Further in the fifth preferred embodiment, when among the grooves 46a to 46d, the groove 46a located nearest to the high-positioned corner cutting edge 5a is represented by a tip end groove, and the groove 46d located nearest to the low-positioned corner portion 5b is represented by a rear end groove, a distance A from the high-positioned corner cutting edge 5a to the tip end groove (46a) is longer than a distance B from the low-positioned corner portion 5b to the rear end groove (46d). Like the fourth preferred embodiment, the strength of the high-positioned corner cutting edge 5a can be sufficiently retained, and cutting force can be reduced while retaining the strength of cutting edge, thereby having excellent cutting performance.

The grooves 46a to 46d have their respective widths gradually increasing from an upper surface 3 toward a lower surface 2. This enables retention of the strength of the main cutting edge 6a.

Otherwise, the configuration is identical to that described in the first to fourth preferred embodiments, and the description thereof is omitted.

Sixth Preferred Embodiment

Figure 11:
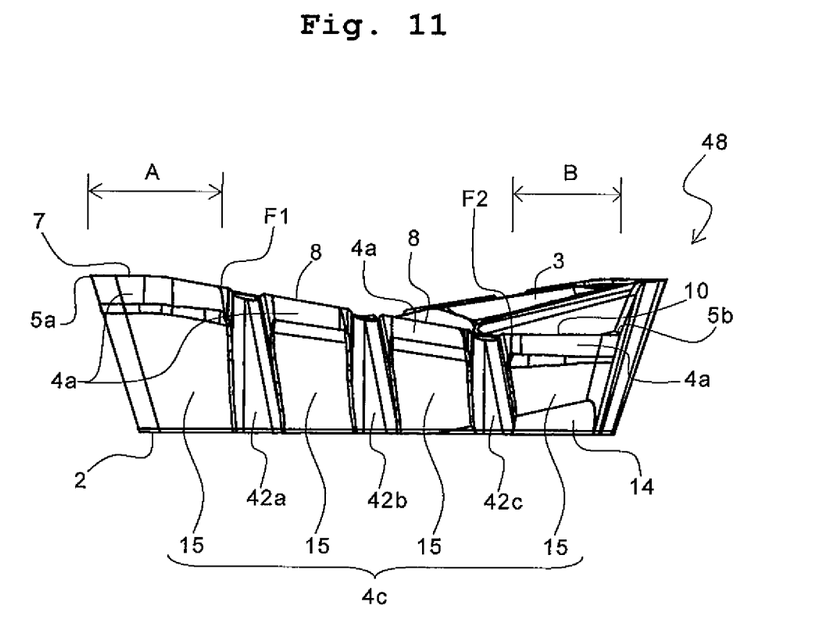
FIG. 11 is a side view showing the cutting insert according to a sixth preferred embodiment of the invention.

A sixth preferred embodiment is next described with reference to the accompanying drawing. In FIG. 11 referred to here, the same references have been used as in FIGS. 1 to 10 for similar parts, and the description thereof is omitted.

The difference between the insert of the sixth preferred embodiment and the insert 41 of the fourth preferred embodiment is the formation of the first flank 11, the second flank 12 and the third flank 13 on the side surface extending from the cutting edge flank 4a to the bottom surface 2. That is, the former has none of these flanks, and the latter has all of them. Specifically, as shown in FIG. 11, in an insert 48 of the sixth preferred embodiment, a side surface 4c extending from a cutting edge flank 4a to a bottom surface 2 comprises a flank 15, whose clearance angle is gradually changed from a high-positioned corner cutting edge 5a toward a low-positioned corner portion 5b. This simplifies the process of machining the side surface 4c, thereby achieving cost reduction.

Like the fourth preferred embodiment, grooves 42a to 42c are formed only at a tilted cutting edge 8 and a second flat cutting edge 10. Therefore, even the configuration of the sixth preferred embodiment is capable of eliminating the strength deterioration of a first flat cutting edge 7 due to the formation of the groove at the first flat cutting edge 7, and retaining the strength of the high-positioned corner cutting edge 5a, so that cutting force can be reduced while retaining the strength of the cutting edge.

Otherwise, the configuration is identical to that described in the first to fifth preferred embodiments, and the description thereof is omitted.

<Cutting Tool and Cutting Method>

Figure 12:
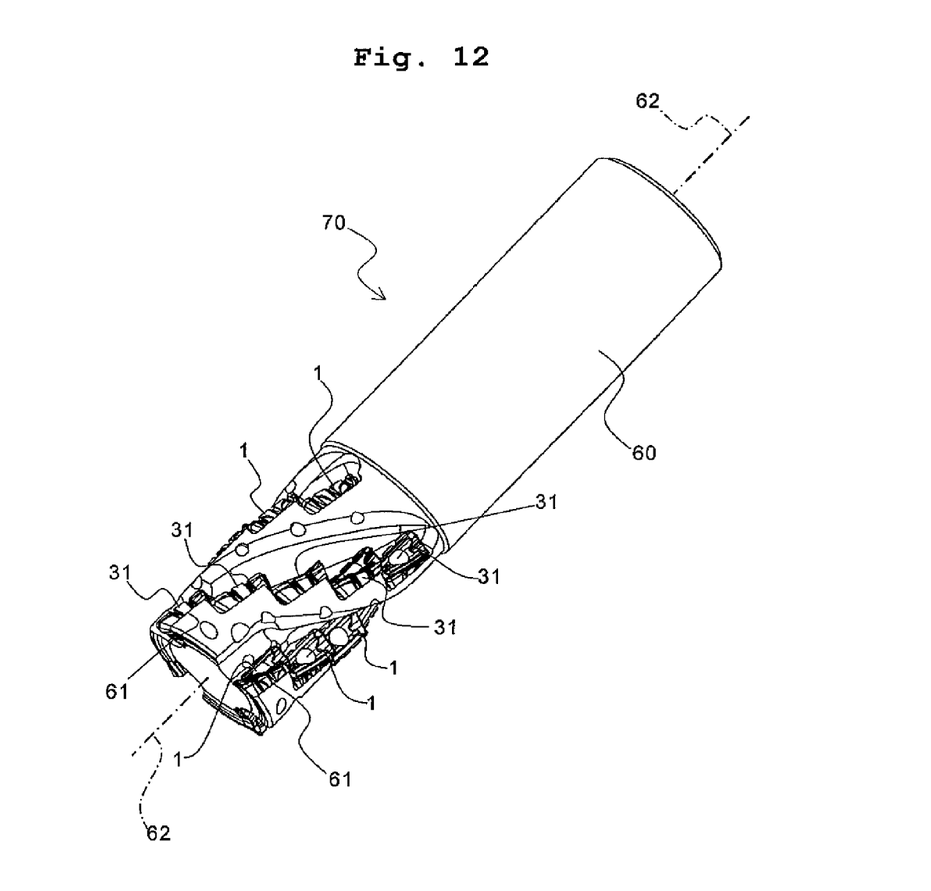
FIG. 12 is a perspective view showing a cutting tool according to a preferred embodiment.

One preferred embodiment of the cutting tool and the cutting method according to the invention is described below with reference to the accompanying drawing. In FIG. 12 referred to here, the same references have been used as in FIGS. 1 to 11 for similar parts, and the description thereof is omitted.

As shown in FIG. 12, a cutting tool 70 according to the present preferred embodiment is an end mill comprising the insert 1 of the first preferred embodiment in which the number of grooves is three, the insert 31 having the same configuration as the insert 1 except that the number of grooves is two, and a substantially cylindrical holder 60 comprising a plurality of cutting insert pockets (hereinafter referred to simply as pockets) 61 for removably mounting these inserts 1 and 31 on the tip end outer periphery thereof. Cutting using the inserts 1 and 31 is carried out by rotating the holder 60 around an axis 62 of the holder 60.

Figure 13:
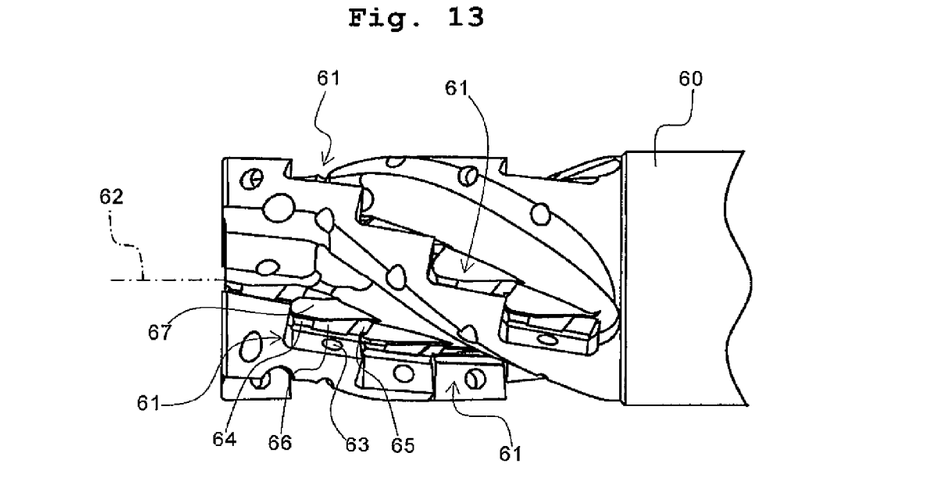
FIG. 13 is a partial enlarged side view showing the vicinity of the tip end of a holder in FIG. 12.

Specifically, as shown in FIG. 13, the pockets 61 provided on the tip end outer periphery of the holder 60 are aligned at predetermined intervals in the circumferential direction of the holder 60 and in a plurality of rows in the direction of the axis 62 of the holder 60. By inserting a clamp screw into the through hole 50 of the insert 1 described above, and engaging the tip end of the clamp screw to a screw hole 63 formed at each of the seats of the pockets 61, a plurality of the inserts 1 are removably mounted on the individual pockets 61 provided in the direction of the axis 62.

Since the first flank 11 and the third flank 13 on the side surface 4b of the insert 1 comprise the clamping surfaces located on substantially the same flat surface, lateral abutting surfaces 64 and 65 of the pockets 61 that abut the first flank 11 and the third flank 13 can also be configured on substantially the same flat surface. It is therefore possible to machine the pockets 61 with high accuracy, so that the insert 1 can be mounted with high mounting accuracy and high clamping force, and the occurrence of vibration during cutting can be further reduced.

The second flank 12 on the side surface 4b of the insert 1 is housed in a notch portion 66 formed between the lateral abutting surfaces 64 and 65 of each of the pockets 61, and the cutting edge-side flank 4a of the insert 1 is housed in a release portion 67 formed at the upper portions of the lateral abutting surfaces 64 and 65 of the pocket 61. Thus, when the insert 1 is mounted on the pockets 61, one main cutting edge 6a not used for cutting is brought into the state of non-contacting with the holder 60.

Here, the insert 1 is mounted on the holder 60 so that when the cutting tool 70 is rotated and contacted with a work material, the first flat cutting edge 7 comes in first contact with the work material in the cutting edge. Mounting the insert 1 on the holder 60 under a specific arrangement enables exhibition of the above-mentioned effect of the insert 1.

On the other hand, a plurality of the inserts 31 are removably mounted on each of the pockets 61 provided in the direction of the axis 62 in the same manner as the insert 1, except that the inserts 31 are mounted so that the cutting edges thereof are located at the uncut portions generated when cutting is carried out by the insert 1 (namely, at the positions corresponding to the grooves 9a, 9b and 9c).

By mounting the inserts 1 and 31 on the individual pockets 61 in the manner described above, the cutting tool 70 having the configuration shown in FIG. 12 can be obtained. The cutting tool 70 is constructed by combining the inserts 1 and 31 having different numbers of grooves, enabling efficient cutting. That is, the insert 1 in which the number of grooves is three has a low cutting force than the insert 31 in which the number of grooves is two, but causes more uncut portions than the insert 31. The inserts 31 cut these uncut portions, enabling efficient cutting while reducing the cutting force.

In the cutting using the cutting tool 70, a work material (a metal work to be cut) can be cut into a desired shape by rotating the holder 60 around the axis 62 of the holder 60 and feeding the holder 60 in the side surface direction or the depth direction with respect to the work material, while bringing the rotating cutting edges of the inserts 1 and 31 into contact with the side surface of the work material.

Figure 14:
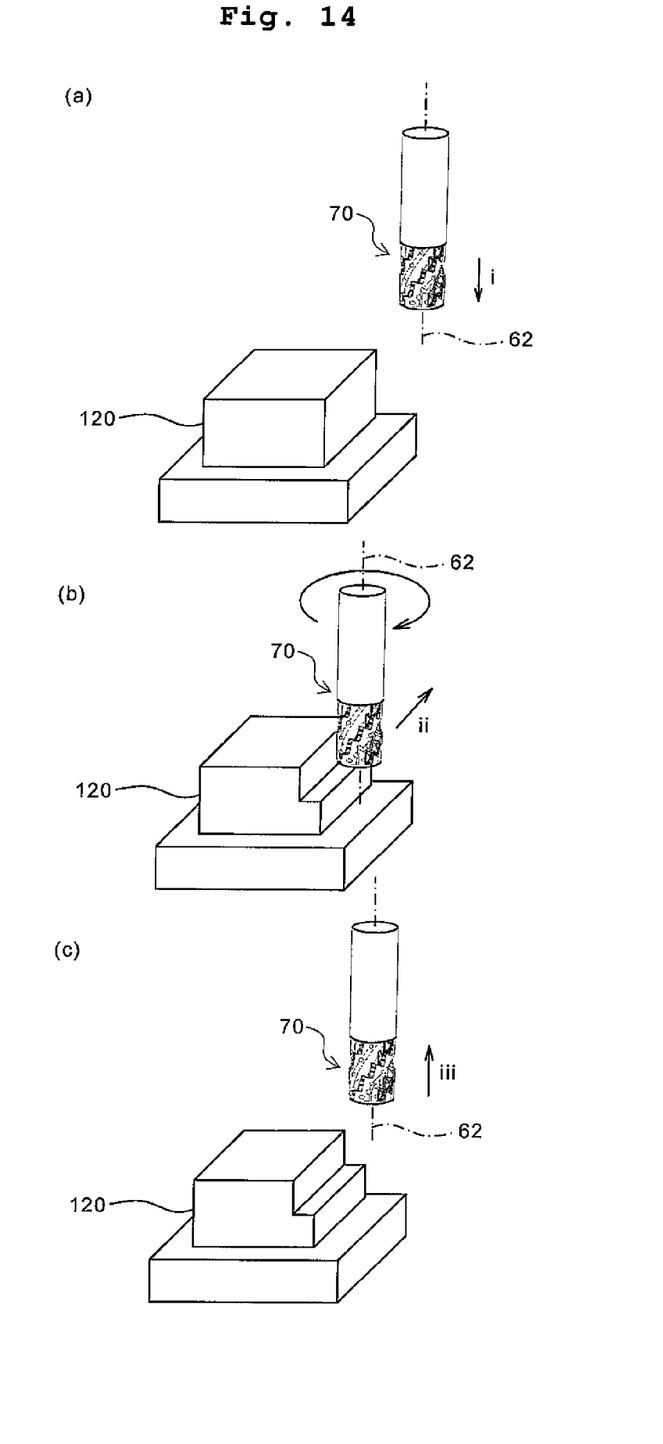
FIGS. 14(a) to 14(c) are process diagrams showing a cutting method according to a preferred embodiment.

Specifically, the method of cutting a work material using the cutting tool 70 includes the approaching step, the cutting step and the leaving step. That is, in the approaching step, as shown in FIG. 14(*a*), the cutting tool 70 is relatively brought near to a work material 120 (in the direction indicated by an arrow "i" in FIG. 14(*a*)). In the cutting step, as shown in FIG. 14(*b*), the cutting tool 70 is rotated, and the work material 120 is cut by bringing the cutting edge of the rotating cutting tool 70 into contact with the surface of the work material 120 while feeding the cutting tool 70 in the direction indicated by an arrow "ii". In the leaving step, as shown in FIG. 14(*c*), the work material 120 and the cutting tool 70 are relatively spaced apart from each other (in the direction indicated by an arrow "iii" in FIG. 14(*c*)).

Hereat, the inserts 1 and 31 comprise a plurality of grooves according to the invention, enabling a further reduction in cutting force. Additionally, a single groove among the plurality of grooves is formed at a region including an intersection "a" of a first extension line S1 formed by imaginarily extending a first flat cutting edge 7 with a second extension line S2 formed by imaginarily extending a tilted cutting edge 8, and the first flat cutting edge 7 and the tilted cutting edge 8 adjoin through the single groove. It is therefore possible to reduce the stress concentrated at the intersection "a" during cutting, and reduce the occurrence of vibration during cutting, and the chipping. Hence, the cutting tool 70 is capable of having excellent cutting performance over a long period, while reducing the occurrence of vibration during cutting.

In the approaching step, the cutting edge and the work material 120 may be relatively close to each other, for example, the work material 120 may be brought near to the cutting tool 70. Similarly, in the leaving step, the work material 120 and the cutting tool 70 may be relatively spaced apart from each other, for example, the work material 120 may be spaced apart from the cutting tool 70. When the cutting is continued, the step of bringing the cutting edge of the rotating cutting tool 70 into contact with different portions of the work material 120 is repeated with the cutting tool 70 held in its rotational state. When the cutting edge in use is worn, the unused cutting edge may be used by rotating the inserts 1 and 31 by 180 degrees with respect to the central axis of the through-hole 50.

Next, other preferred embodiment of the cutting tool according to the invention is described. The cutting tool of the present preferred embodiment has the same configuration as the cutting tool 70 described above, except that the insert 1 is replaced with the insert 41 of the fourth preferred embodiment comprising the three grooves, and that the insert 31 is replaced with an insert having the same configuration as the insert 41 except for comprising two grooves.

In these inserts, a predetermined number of grooves are formed only at the tilted cutting edge 8 and the second flat cutting edge 10. The distance A from the high-positioned corner cutting edge 5*a* to the tip end groove is longer than the distance B from the low-positioned corner portion 5*b* to the rear end groove, and therefore cutting force can be reduced while retaining the strength of the cutting edge, thereby having excellent cutting performance. Consequently, the cutting tool of the present preferred embodiment has a small cutting force during cutting, enabling to give excellent cutting performance over a long period of time.

Otherwise, the configuration is identical to that described in the above previous preferred embodiment, and the description thereof is omitted.

While the several preferred embodiments according to the invention have been described above, the invention is not limited the foregoing preferred embodiments, and they are, of course, applicable to those incorporating changes and improvements within a range not departing from the gist of the invention. For example, in the foregoing preferred embodiments, the inserts in which the number of the grooves is two to four, the number of grooves in the present invention is not limited thereto, it may be selected arbitrarily in the range of normally from about one to six, preferably two to four, in order to avoid the drop in the insert strength and reduce cutting force. By forming a plurality of predetermined grooves within the range, cutting force can be further reduced.

Figure 15:
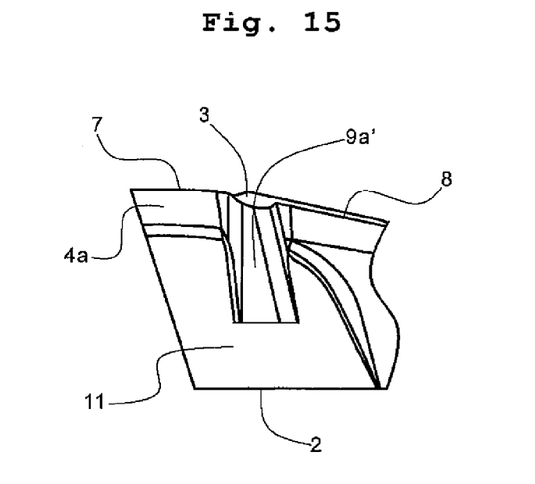
FIG. 15 is a partial enlarged side view showing other example of a groove according to the embodiment of the invention.

Although the grooves in the foregoing preferred embodiments have substantially the same shape and formed at substantially equal space intervals in the longitudinal direction of the inserts, the grooves may have different shapes and different space intervals depending on the purpose. For example, although in the insert 1 of the first preferred embodiment, among the grooves 9*a*, 9*b* and 9*c*, the grooves 9*a* and 9*b* extend from the upper surface 3 to the bottom surface 2, the grooves of the present invention may have such a shape as to extending from the side surface 4 to the upper surface 3 to divide the main cutting edge 6*a*. Therefore, the groove 9*a* may be formed, for example, in the shape as a groove 9*a*' shown in FIG. 15.

Although in the foregoing preferred embodiments, the inserts having substantially a parallelogram when viewed from above have been described, the shape of the insert according to the invention is not limited thereto, and it may be in a polygon such as a substantially triangle or a substantially pentagon. As a method of mounting the insert on the holder, there has been described a clamp method in which the insert is screwed into the pockets of the holder. Alternatively, clamp-on method, lever lock method or the like may be employed.

Although in the cutting tool 70, the case of combining the inserts having a different number of grooves has been described, the present invention is not limited thereto, and the cutting tool may be formed by inserts having the same number of grooves.

The invention claimed is:

1. A cutting insert comprising:
   an insert main body having an upper surface and a plurality of side surfaces;
   a cutting edge located between both ends of a ridge which is between at least one side surface among the side surfaces and the upper surface;
   a high-positioned portion located at one end of the ridge; and a low-positioned portion located lower in a thickness direction of the insert main body than the high-positioned portion and located at the other end of the ridge, wherein the cutting edge comprises a first flat cutting edge having substantially the same height as the high-positioned portion, the first flat cutting edge extending perpendicular to the thickness direction of the insert, and a tilted cutting edge having a height decreasing from the high-positioned portion toward the low-positioned portion, at least one groove extends from at least one side surface to the upper surface to divide the cutting edge by the groove, and at least the one groove is formed in a region including an intersection of a first extension line formed by imaginarily extending the first flat cutting edge with a second extension line formed by imaginarily extending the tilted cutting edge.

2. The cutting insert according to claim 1, wherein a plurality of the grooves are formed on at least the one side surface.

3. The cutting insert according to claim 2, wherein among the plurality of the grooves, the groove located nearest to the high-positioned portion is formed at a region including an intersection of the first extension line formed by imaginarily extending the first flat cutting edge with the second extension line formed by imaginarily extending the tilted cutting edge.

4. The cutting insert according to claim 2, wherein among the plurality of grooves, the groove nearest to the high-positioned portion has a width increasing from the upper surface toward the lower surface of the cutting insert.

5. A cutting tool comprising a plurality of the cutting inserts according to claim 1 mounted on the tip end outer periphery of a tool holder, wherein the cutting inserts are mounted on the tool holder so that the first flat cutting edge in each of the cutting inserts comes in first contact with a work material in the cutting edge during cutting.

6. A cutting method of cutting a work material, comprising:
bringing the cutting tool according to claim 5 closer to the work material relatively;

cutting the work material by rotating the cutting tool and bringing the cutting edge of the rotating cutting tool into contact with the surface of the work material; and spacing apart the work material and the cutting tool relatively.

7. The cutting insert according to claim 1, wherein
the first flat cutting edge and the tilted cutting edge adjoin through the one groove.

8. The cutting insert according to claim 7, wherein a plurality of the grooves are formed on at least the one side surface.

9. The cutting insert according to claim 1, wherein
the cutting edge comprises a second flat cutting edge having substantially the same height as the low-positioned portion, and the tilted cutting edge is located between the first flat cutting edge and the second flat cutting edge, and at least the one groove is formed in a region including an intersection of the second extension line formed by imaginarily extending the tilted cutting edge with a third extension line formed by imaginarily extending the second flat cutting edge.

10. The cutting insert according to claim 1, wherein at least the one side surface comprises a cutting edge-side flank formed adjacent to the cutting edge, the cutting edge-side flank having a clearance angle sequentially increasing from the high-positioned portion toward the low-positioned portion.

11. The cutting insert according to claim 10, wherein
a portion of at least the one side surface which extends from the cutting edge-side flank to the lower surface of the cutting insert comprises:
a first flank at a low-positioned region of the first flat cutting edge;
a second flank at the low-positioned region of the tilted cutting edge; and
a third flank at the low-positioned region of the second flat cutting edge, and
the first flank and the third flank comprise clamping surfaces which are on substantially the same surface as each other respectively.

\* \* \* \* \*